UNITED STATES PATENT OFFICE.

WILLIAM D. LATHAM, OF ANGELICA, NEW YORK.

IMPROVEMENT IN CEMENTS.

Specification forming part of Letters Patent No. 179,576, dated July 4, 1876; application filed April 22, 1876.

*To all whom it may concern:*

Be it known that I, W. D. LATHAM, of Angelica, in the county of Allegany, and in the State of New York, have invented certain new and useful Improvements in Cement; and do hereby declare that the following is a full, clear, and exact description thereof.

The design of my invention is to furnish a cheap and convenient means whereby leather, wood, glass, and other like substance may be firmly united together; and to this end it consists in a liquid cement composed of the ingredients compounded and relatively proportioned in the manner substantially as hereinafter specified.

My cement is composed of crude gutta-percha, one ounce; india-rubber, five grains; and chloroform, one pound.

The gutta-percha and rubber are cut into small pieces, and placed in a bottle, after which the chloroform is added, and the whole permitted to stand twenty-four hours before use.

The surfaces to be joined together are each cleansed from all dirt, and covered with the cement, and are then well heated, and firmly pressed together until said cement has time to set. For leather or other flexible substances the joint should be hammered after the cement has been applied.

Having thus fully set forth the nature and merits of my invention, what I claim as new is—

The hereinbefore-described cement, composed of gutta-percha, india-rubber, and chloroform, in the proportions substantially as and for the purpose specified.

In testimony that I claim the foregoing I have hereunto set my hand this 19th day of April, 1876.

WILLIAM D. LATHAM.

Witnesses:
 H. E. DUDLEY,
 J. L. FERGUSON.